United States Patent [19]

Lamotte et al.

[11] Patent Number: 5,035,556

[45] Date of Patent: Jul. 30, 1991

[54] MACHINE FOR AUTOMATICALLY REGULATING AND MEASURING THE LENGTH OF EXTENSION AND THE DIAMETER OF A TOOL

[75] Inventors: Lionel Lamotte, Libération; Jean-Claude Mirey, Albert; Jean Omiel, Englebelmer; Jean-Pierre Gaquere, Mailly Maillet, all of France

[73] Assignee: Aerospatiale Societe Nationale Industrielle, Paris, France

[21] Appl. No.: 368,335

[22] PCT Filed: Nov. 24, 1987

[86] PCT No.: PCT/FR87/00467

§ 371 Date: Jun. 7, 1989

§ 102(e) Date: Jun. 7, 1989

[87] PCT Pub. No.: WO89/04741

PCT Pub. Date: Jun. 1, 1989

[51] Int. Cl.⁵ .................. B23C 9/00; B23B 49/00; G06F 15/46; B27G 23/00
[52] U.S. Cl. ..................... 409/218; 33/639; 33/640; 364/474.34; 408/13
[58] Field of Search .............. 29/568; 409/234, 213, 409/218, 134, 187; 408/8, 13; 364/474.21, 474.17, 474.34, 474.35, 474.26, 474.37; 318/571, 573; 33/626, 628, 639, 640

[56] References Cited

U.S. PATENT DOCUMENTS

| | | | |
|---|---|---|---|
| 2,350,273 | 5/1944 | Decker | 214/6 |
| 2,658,268 | 11/1953 | Knauf et al. | 29/203 |
| 2,973,108 | 2/1961 | Gable | 214/8 |
| 3,103,006 | 9/1963 | Anthony | 340/324 |
| 3,124,976 | 3/1964 | Pittwood | 29/26 R |
| 3,214,822 | 11/1965 | Paulick | 29/57 |
| 3,701,199 | 10/1972 | Lewis | 33/1 M |
| 4,117,493 | 10/1978 | Holland et al. | 333/628 X |
| 4,334,178 | 6/1982 | Hille | 318/572 |
| 4,451,892 | 5/1984 | McMurtry | 364/474.17 |
| 4,507,850 | 4/1985 | Kielma | 318/572 |

FOREIGN PATENT DOCUMENTS

| | | |
|---|---|---|
| 247939 | 2/1912 | European Pat. Off. . |
| 8522361 | 2/1916 | Fed. Rep. of Germany . |
| 2518466 | 11/1975 | Fed. Rep. of Germany . |
| 2103548 | 4/1972 | France . |

OTHER PUBLICATIONS

Automatic Tool Sizing for Auto-Changers, Metalworking Production, vol. 124, No. 9, (Sep. 1980), pp. 123 and 127.

Primary Examiner—William Briggs
Attorney, Agent, or Firm—Fisher, Christen & Sabol

[57] ABSTRACT

Machine for automatically regulating and measuring the length of extension and the diameter of a tool. The present invention relates to a machine for automatically regulating and measuring the length of extension and the diameter of a tool 2 mounted in a conical mandrel 3 cooperating with receiving cone 7 of machine, the mandrel 3 comprising means 9 for tightening and means 17 for adjusting said tool. According to the invention, the machine comprises a frame 25, two carriages 26 and 27 movably mounted on the frame, the first carriage 26 comprising the receiving cone 7 receiving the conical mandrel provided with the tool, control means 31, 32, 35, 39 acting on said tightening and adjusting means 9 and 17, the second carriage 27 comprising a means 48 for detecting and measuring said tool making it possible, when the tool comes into contact with the means 48, to measure the length of extension of the tool 2 with respect to the mandrel 3, the placing of the tool in contact against the detection means being effected by the adjusting means, as well as the measurement without contact of the diameter of the tool.

17 Claims, 3 Drawing Sheets

MACHINE FOR AUTOMATICALLY REGULATING AND MEASURING THE LENGTH OF EXTENSION AND THE DIAMETER OF A TOOL

The present invention relates to a machine for automatically regulating and measuring the length of extension and the diameter of a tool, mounted in a conical mandrel and capable of cooperating with a receiving cone of the machine, as well as for measuring the diameter of said tool.

The machine is more particularly adapted to cutting tools, such as for example mills with smooth cylindrical shank each mounted in a conical mandrel provided with an opening axial tap, receiving the smooth cylindrical shank of the mill. The conical mandrel comprises, in known manner, means for tightening the tool, as well as an adjustment means housed in the axial tap and against which the shank of the tool comes into contact.

The assembly constituted by the conical mandrel and the tool is intended to be arranged, once the operations of adjustment and of measuring have been effected, in one of the broaches or machining heads of a numerical-control machine tool. This type of multi-broach machine tool is more and more widespread in manufacturing workshops for economical reasons of productivity, quality of machining, reliability and cost, since they make it possible, for example, to effect identical machinings on the same workpiece or on a plurality of workpieces fast with the table of the machine-tool, from the assemblies mentioned hereinabove each mounted in one of the broaches of the machine tool.

In order to obtain identical machinings and to avoid waste of the machined workpieces not coming up to required dimensions, it is thus imperative, before mounting each assembly fitting in a receiving cone of the broach, to regulate and measure with precision, to within the tolerances, the length of extension of each tool with respect to a reference of the mandrel and the diameter of each of the tools.

At the present time, the operations of adjustment and of measurement, for this type of determined tools, which mills with smooth cylindrical shank are, are carried out manually by acting on the adjustment means, such as a screw, via a screwdriver, which makes it possible to adjust the dimensions or length of extension of the mill with respect to the mandrel. Measurement is then effected by means of a short measuring tape and a comparator, then the operator, with the aid of a spanner, acts on the tightening means, such as a nut, thus blocking the mill via an elastic split bush, which holds the shank of the mill. Whilst the operator is tightening the nut, the mill tends to descend with the bush, which may modify the length of extension of the mill, particularly in the case of the operator exerting a tightening torque greater than that theoretically provided.

These operations, described succinctly, are to be renewed for each tool and mandrel assembly intended to equip the broaches of the numerical-control machine tool. Prior to their respective assembly in said broaches, these assemblies are passed over a measuring bench indicating the lengths of extension and the diameter of the mills. When, for example, the length of extension of a tool does not correspond to the length required, the assembly must be manually adjusted again.

Consequently, all of the operations, for the majority carried out manually, for effecting adjustment and measurement of the length and diameter of each mill in its respective mandrel, require several work stations, appropriate equipment for each of these stations, as well as staff allocated for these operations, and require considerable time.

The present invention has for its object to overcome these servitudes and concerns the design of a machine which, prior to mounting each assembly constituted by a tool and a mandrel in the broaches of the machine-tool, allows automatic adjustment and measurement of the length of extension of each tool, as well as the measurement of their diameter, said machine being equipped with a receiving cone identical to that with which the broaches of the machine tool are provided.

To that end, according to the invention, the machine for automatically adjusting and measuring the length of extension of a tool mounted in a conical mandrel capable of cooperating with a receiving cone of said machine, said conical mandrel being provided with an opening axial tap adapted to receive said tool, and comprising a means for tightening said tool, as well as a means for adjusting said tool housed in said axial tap, said tool coming into contact with said adjustment means, is noteworthy in that it comprises:

a frame, two carriages movably mounted on said frame, the first of said carriages comprising said receiving cone receiving said conical mandrel provided with the tool, a first control means acting on said tightening means, a second control means acting on said adjustment means, the second of said carriages comprising a means for detecting and measuring said tool making it possible, when said tool comes into contact with said means, to measure the length of extension of the tool with respect to the mandrel, the placing of the tool in contact against said detection and measuring means being effected by said adjustment means, a programmer in which are programmed the operations of adjustment and measurement carried out in accordance with an automatic cycle established previously, a control keyboard disposed on said frame for the introduction of specific data in said programmer, and a display means receiving a signal from said detection and measuring means, corresponding to a magnitude representative of the length of extension of said tool, and indicating said length.

In this way, thanks to the invention, once the tool has been mounted in the conical mandrel, then the assembly introduced in the corresponding receiving cone of the machine, and the specific data entered in the programmer, the operator acts on a starting button located on the control keyboard, and without any other intervention by this operator, the machine adjusts, then measures the length of extension of the tool in accordance with the automatic cycle previously established.

According to another feature of the invention, the two carriages movably mounted on the frame move at right angles with respect to each other.

In a preferred embodiment, said first control means of the first carriage, capable of acting on the tightening means, is constituted by a motor cooperating by means of gear means with a corresponding toothed profile arranged on the tightening means.

In this way, the value of the tightening torque furnished by the motor and exerted on the tightening means is identical for each tool and mandrel assembly. In that case, said tightening means of each assembly always occupies the same position once this assembly is introduced in the receiving cone. Consequently, this position is advantageously determined so that it lies at a distance from the detection and measuring means corresponding to the desired length of extension of the tool.

In a preferred embodiment, the second control means capable of acting on said adjustment means housed in said conical mandrel may be constituted by a rod of which one end cooperates with said adjustment means and of which the other end is connected to a motor disposed on said carriage.

According to another feature of the invention, there is provided on the first carriage a traction means intended to grip said conical mandrel in order to maintain it pressed against said receiving cone of said carriage. In this way, the operator is sure that said mandrel is in the same configuration of docking with the female cone as on the machine.

In a preferred embodiment, said traction means is constituted by a hollow tie-rod adapted to be fixed in the end of said conical mandrel via a motor disposed on said carriage and controlling the movement of said tie-rod, the latter enveloping said rod.

In an advantageous embodiment, said means for detecting and measuring said tool, disposed on the second carriage, is constituted by a measuring sensor against which the front face of said tool is capable of being applied. In this way, when said front face of the tool, via said adjustment means, comes into contact with said sensor, the latter, for example connected to said motor, controls the adjustment means, cuts said motor and emits towards the display device a signal corresponding to a magnitude representative of the length of extension of said tool.

Said machine according to the invention makes it possible not only to adjust and measure the length of extension of said tool, but also to measure the diameter of said tool.

To that end, said second carriage comprises a measuring means making it possible to effect measurement of the diameter of said tool.

In a preferred embodiment, said means for measuring the diameter of said tool is constituted by an optical sensor disposed on said second carriage, the output signal of said sensor corresponding to a magnitude representative of the diameter of said tool being addressed to said display means.

A computer connected to said display means advantageously makes it possible to effect, on the one hand, the average of said lengths of extension of a series of adjusted and measured tools, and, on the other hand, the average of the measured diameters of said series of tools.

In this way, the operator is warned if a tool of the same series has a length of extension different from the average length, with a determined tolerance. The same applies concerning the measured diameters of the tools.

The Figures of the accompanying drawings clearly show how the invention may be carried out. Identical references designate like elements.

Figure 1:
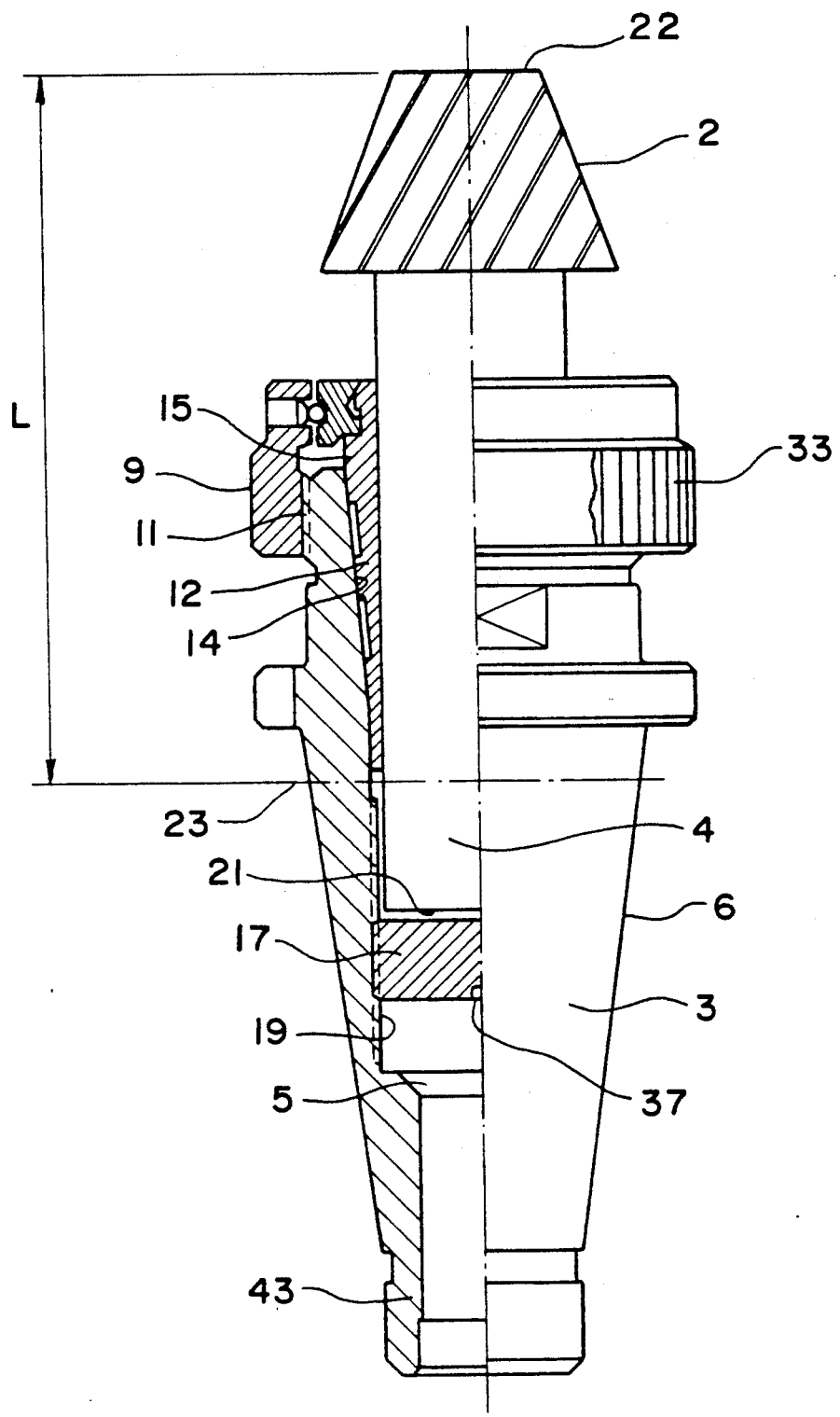
FIG. 1 shows, half in axial section and half in outside view, a tool mounted in a conical mandrel.

The machine 1 according to the invention (FIG. 2) is intended to adjust and measure the length of extension of a tool 2 in a conical mandrel 3 and likewise to measure the diameter of said tool (cf. FIG. 1). The latter is a mill with smooth cylindrical shank 4, which is introduced in an opening axial tap 5 made in the conical mandrel 3. The outer conical profile 6 of the mandrel is capable of cooperating with a female receiving cone 7 of the machine 1.

Mandrel 3 comprises a means for tightening the tool constituted by a nut 9 screwed on an outer part 11 of the mandrel, and cooperating with a split bush 12, housed in a complementary conical part 14 terminating an end 15 of the opening axial tap 5. The conical bush 12 is pressed, during tightening of the nut, against the conical part 14, then is applied on the cylindrical shank 4 of the mill 2. Mandrel 3 comprises an adjustment means such as a screw 17, cooperating with a threaded part 19 made in the axial tap 5. This screw 17, against which the end face 21 of the cylindrical shank 4 is applied, thus allows adjustment of the length of extension L of the mill with respect to a determined reference. This length of extension L, which it is desired to obtain for each of the assemblies constituted respectively by a mandrel and a mill, is for example that comprised between the front face 22 of the mill 2 and the reference 23 of the cone.

Figure 2:
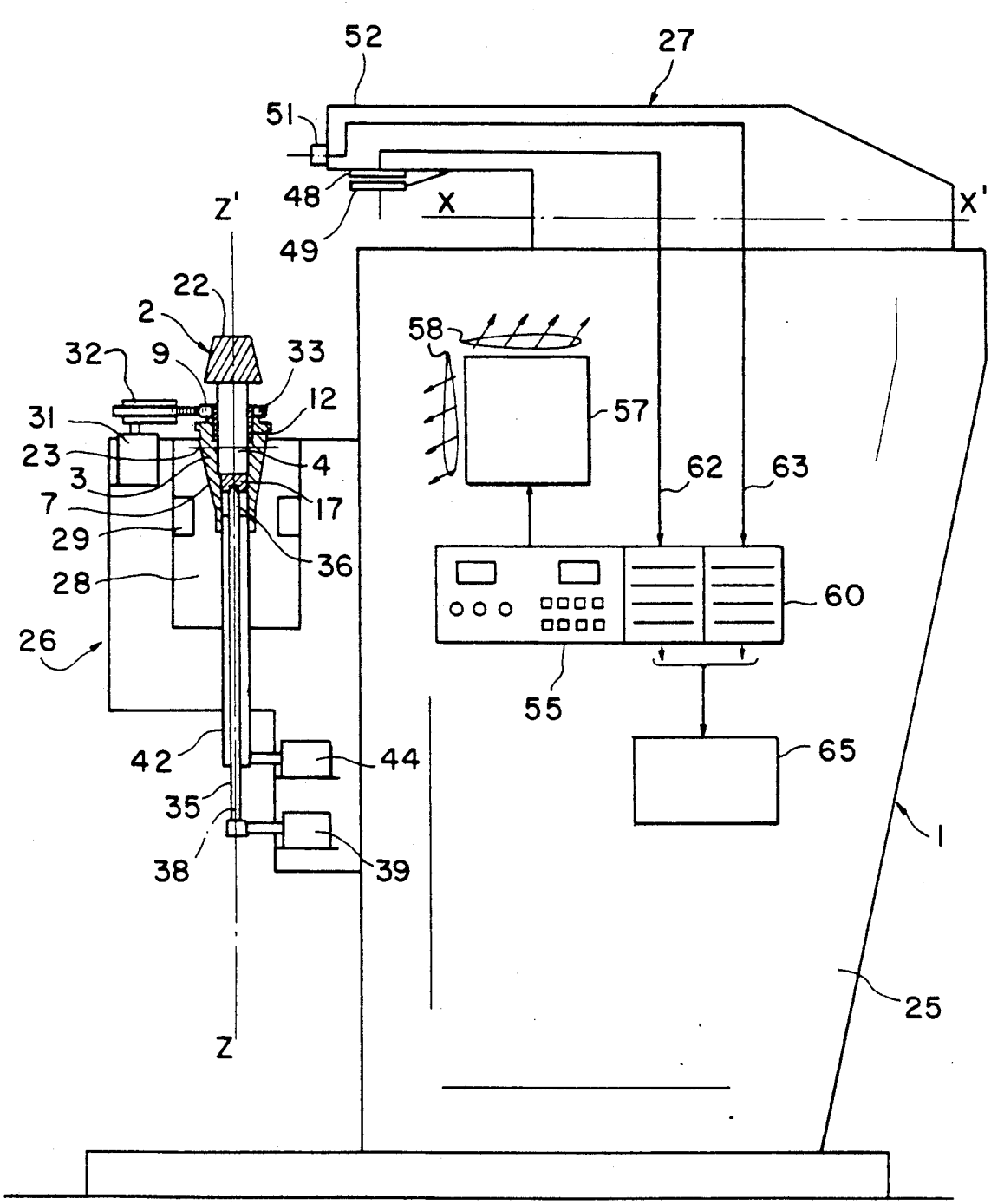
FIG. 2 shows a simplified view of the machine according to the invention, comprising said tool mounted in said mandrel.

As may be seen in FIG. 2, the machine 1 is principally constituted by a frame 25 fixed to the ground and by two carriages 26 and 27 movably mounted with respect to the frame 25. The two carriages are disposed at right angles with respect to each other. The first carriage 26 is capable of moving along a substantially vertical axis Z—Z' and the second carriage 27 is capable of moving along a substantially horizontal axis X—X'. Both may slide in slideways (not shown in the Figure), thanks to motors provided to that end, but not shown.

The first carriage 26 comprises the receiving cone 7 receiving the conical mandrel 3 which bears the mill 2. This cone is fast with a broach 28 corresponding to those mounted on the numerical-control machine tool mentioned above, adapted to receive each mandrel/mill assembly. The broach 28 is moved in rotation, about axis Z—Z', by a motor 29.

Carriage 26 comprises a first control means acting on the tightening nut 9. This first control means makes it possible to screw the nut 9 of each assembly with an identical, theoretically determined tightening torque, and is schematically constituted by a motor 31 arranged on the first carriage 26 and cooperating, for example by means of gears 32, with a toothed profile 33 arranged on the tightening nut 9.

Carriage 26 comprises a second control means capable of acting on the adjusting screw 17 of the mandrel 3. The second control means is constituted by a rod 35 of which one end 36 cooperates with the impression 37 made on that face of the screw 17 opposite the one in contact with the end face 21 of the mill shank 4. This rod 35 is coupled at its other end 38 with a motor 39, schematically illustrated, fast with the carriage 26, and whose function is to ensure rotation of the rod 35 about axis Z—Z', bringing about adjustment of the extension of the mill 2 via the screw 17.

Moreover, means for pulling the mandrel 3 in the receiving cone 7 are provided in said first carriage 26, and are constituted by a tie-rod 42 adapted to cooperate with the end 43 of the axial tap 5, in order to grip said conical mandrel 3.

The tie-rod 42 is controlled in rotation by a motor 44 fast with the carriage 26, which tie-rod 42 envelops rod 35 without touching it.

The second carriage 27 comprises a detection and measuring means, for example an electronic sensor 48, making it possible, when the front face 22 of the mill 2 comes into contact with the sensor, to emit a signal corresponding to the value of the length of extension of the mill, the mill being placed at suitable length by the rod 35 moved by the motor 39 and acting on the adjusting screw 17. The axis of the sensor 48 is then merged with the axis Z—Z' of the carriage 26 corresponding to the axis of the receiving cone 7. Moreover, there is associated with the electronic sensor 48 a retractable sensor cover 49.

The second carriage 27 comprises, moreover, a means for measuring the diameter of the mill arranged on the end 52 of this second carriage 27 and capable of emitting a signal corresponding to the value of the diameter noted.

On the frame 25 of the machine is arranged a control keyboard 55 enabling the operator to introduce a plurality of specific data in a programmer 57 connected to the keyboard 55, and of which the program was previously determined, then memorized therein.

In particular, the operator introduces the number of mills to be regulated and measured in a series, the type of cone used, the length of extension of the mills, identical for all, outside the respective conical mandrel and the theoretical diameter of the mill. The machine is then capable of carrying out an automatic cycle thanks to this programmer 57, making it possible to adjust the length of extension of each mill associated with its conical mandrel, to measure this length and also to measure the diameter of the mill. The outputs 58 of the programmer (shown schematically) are connected to the various motors and servocontrols of the machine.

The length of extension L, which must be identical for each mill/mandrel assembly of the same series, is previously determined as a function of the machinings to be made on the workpieces disposed on the work table of the numerical-control machine tool, and is introduced by the operator in the programmed cycle in the programmer 57 by means of the control keyboard 55. The dimension which defines the length of extension L of the mill is included between the front face 22 thereof and the reference of the cone 23. In this way, the dimension is obtained when the front face 22 of the mill comes into contact with the measuring sensor 48, the reference of the cone having to lie at a distance corresponding to this dimension. The position of the reference of the cone 23 must in that case be known, the programmed in the programmer, so that the first carriage 26, receiving the conical mandrel 3 in the receiving cone 7, stops in a position for which the reference of the cone 23 of the nut lies at a distance from the measuring sensor 48 corresponding to the determined length of extension L of the mill, when the latter comes into contact by its front face 22 with the sensor 48. Upon assembly of the mill in the axial tap 5, the front face 22 thereof emerges by a length shorter with respect to the reference of the cone 23, the placing of the mill at the length of extension L being obtained by the adjusting screw 17.

The reference position of the cone is previously determined by the conical connection between the male conical mandrel 3 and the female receiving cone 7, both of corresponding conicity. This type of conical connection is standardized with extremely restrained tolerances, which means that, when the conical mandrel is placed in position in the receiving cone, this conical mandrel is always positioned identically in this cone. In this way, it is certain that, for all the conical mandrels of the same type disposed successively in the receiving cone, they all occupy the same position in the receiving cone. The machine according to the invention comprises a display device 60, for example integrated in the control keyboard 55, receiving, on the one hand, a signal 62 emitted by the measuring sensor 48 and corresponding to a magnitude representative of the length of extension L of the mill 2, and, on the other hand, a signal emitted by the optical sensor 51 and corresponding to a magnitude representative of the measured diameter of the mill.

A computer 65 connected to the display means 60 advantageously records said noted values and makes it possible then to effect, on the one hand the average of the lengths of extension L of the mills displayed in the display means of a series and, on the other hand, the average of the diameters D measured and displayed.

In this way, the computer indicates whether one of the lengths of extension of the mills is outside the tolerances fixed by the operator concerning the value of the average of the lengths of extension. The same applies if one of the diameters measured is outside the tolerances fixed for the value of the average of the diameters.

The cycle of operation of the machine according to the invention illustrated in FIGS. 2, 3, 4, 5 and 6 is as follows:

The identical mills of a series are each placed in a conical mandrel corresponding to the receiving cone of the machine. The operator enters into the programmer 57, by means of the control keyboard 55, the data relative to the number of mills to be regulated in the series, to the type of cone, to the length of adjustment of extension of the mills and to the theoretical diameter of the mills.

He introduces the first assembly, constituted by a mill 2 housed in a conical mandrel 3, in the receiving cone 7 of the machine. The conical connection between the male cone 3 and the female cone 7 makes it possible to obtain the same positioning for all the mandrels 3 in said receiving cone 7. He validates the automatic operational cycle of the machine programmed in the programmer 57. The first carriage 26 lies in low position in the slideways and the second carriage 27 lies in position of recoil in the slideways (FIG. 2). The cycle starts by switching on the motor 44 driving the tie-rod 42 in rotation, which has for a consequence correctly to ensure, for example by screwing the tie-rod in the threaded end 43 of the axial tap 5 of the conical mandrel 3, the docking of the mandrel in the receiving cone 7, thus reproducing in similar manner the docking of the mandrel in one of the broaches of the numerical-control machine-tool.

The conical mandrel 3 being maintained in this position, motor 44 stops, then motor 39 starts up, allowing rotation about axis Z—Z' of the rod 35. The end 36 of the latter cooperates with the impression 37 made in the adjusting screw 17, until the screw comes into abutment against a shoulder arranged in the axial tap 5. The screw 17 is thus in low position, in order to allow maximum penetration of the mill 2, which abuts by the shank 4 against face 21 of the screw 17.

Motor 39 stops, then the program makes it possible to trigger off motor 31 of the means for tightening the nut 9. Via the set of gears 32 cooperating with the toothed profile 33 of the nut 9, the latter is tightened at a determined torque. The tightening of the nut presses the conical part of the elastic bush 12 against the conical part 14 of the axial tap, which has for a consequence to apply the bush 12 against the outer profile of the shank 4.

Motor 31 then rotates in opposite direction in order slightly to untighten the nut 9, thus allowing the slide without clearance of the shank 4 of the mill with respect to the bush 12 and therefore to the conical mandrel 3. The second carriage 27 moved by its motor then moves until the axis of the sensor 48 is coaxial to and merges with axis Z—Z' of the mill/mandrel assembly housed in the receiving cone 7.

Figure 3:
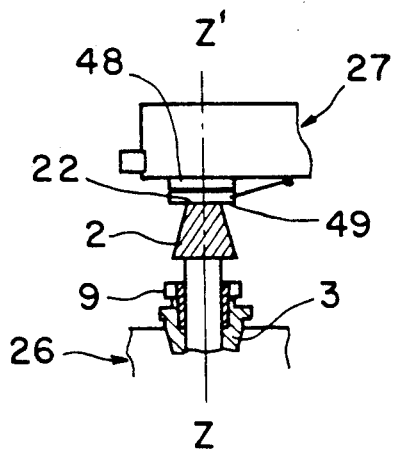
FIGS. 3, 4, 5 and 6 are schematic partial views illustrating certain phases of the automatic cycle of said machine.

The first carriage 26 is then actuated so that the front face 22 of the mill 2 comes into contact, then abuts against the sensor cover 49 (FIG. 3). The mill is thus in abutment against the face 21 of the screw 17.

Figure 4:
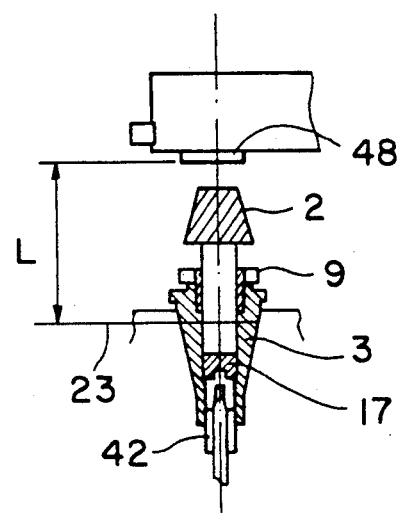

The first carriage 26 descends by a reverse rotation of the motor as far as the previously determined position, i.e. the one corresponding to the position of the reference of the cone located at a distance from the sensor corresponding to the length of extension L of the mill (FIG. 4). The carriage 26 is therefore in a position for which the reference of the cone 23, taken as origin of the length of extension of the mill when the nut 9 is tightened at its tightening torque, is at a dimension from the sensor 48 corresponding to the length L displayed by the operator.

Figure 5:
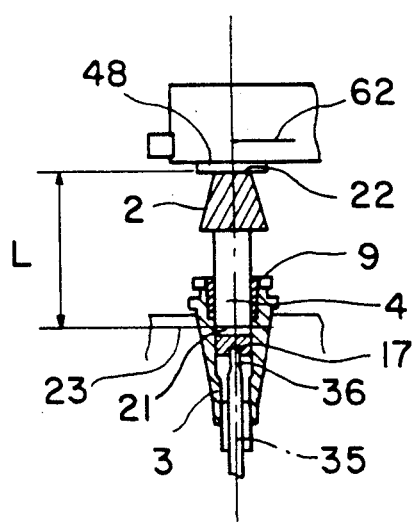
Figure 6:
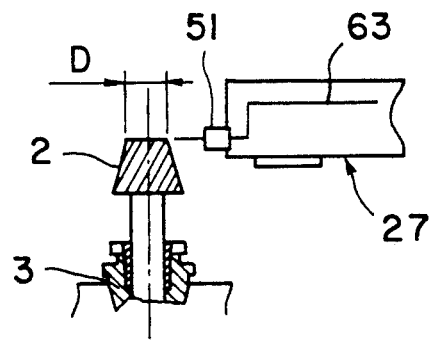

The carriage thus occupies this position defined in the programmer, then the motor 39 is again in action in a direction opposite its preceding rotation, provoking rise of the mill via the rotation of the rod 35 cooperating with the adjusting screw 17. The mill continues to rise until the front face 22 comes into contact with the sensor 48, of which the sensor-cover 49 was previously retracted. The contact of the front face 22 of the mill 2 with the sensor 48 provokes slowing-down, then stop of the motor 39 and therefore the rotation of the rod 35 and the screw 17 (FIG. 5). To that end, the sensor is for example directly connected to motor 39.

The cycle continues by the descent of the first carriage 26 in its preceding initial position in order to eliminate contact between the mill and the sensor, and to block the nut 9 at the determined tightening torque.

The length of extension L of the mill is then verified. To that end, the first carriage 26 is raised until the front face of the mill comes into contact with the sensor. A signal 62 delivered by the sensor and corresponding to a magnitude representative of the length of extension of the mill is addressed to the display means 60, which indicates the value of the length of extension of the mill. This value is also introduced into the computer 65.

Descent or carriage 26 and recoil of carriage 27 are then programmed. Motor 29 of the broach 28 of the receiving cone 7 is then started up, driving in rotation, about axis Z—Z', the conical mandrel 3 and the mill 2. The rise of the carriage 26 moved by its motor is then effected up to a previously determined dimension, then memorized in the programmer 57, for reading the diameter of the mill. The second carriage 27 slides in its slideways along axis X—X' until the optical sensor 51 (FIG. 6) lies opposite the mill 2 to measure its diameter. An output signal 63, delivered by the sensor 51 and corresponding to a magnitude representative of the diameter of the mill, is addressed to the display means 60 and to the computer 65. When the measurement is effected, carriage 27 recoils and carriage 26 descends by actuation of their respective motor, as far as an initial position of the beginning of cycle. The motor 44 is then controlled to disconnect the tie-rod 42 from the conical mandrel 3. The cycle is then terminated, the length of extension being measured and displayed, as well as the diameter of the mill.

The operator withdraws this assembly then introduces a new assembly, and this up to the last assembly of the series.

The display means 60 then indicates the measurements of length of extension and of diameter for each mill of the assemblies constituting the series. The computer 65 effects, on the one hand, the average of the lengths of mill regulated and measured and, on the other hand, the average of the diameters of mills.

The average of the lengths is indicated with a determined tolerance and if the length of one of the mills is different from the average dimension given the tolerance admitted, the length of extension of this mill would then be adjusted again by the machine.

Likewise, the average of the diameters is indicated with a determined tolerance and if the diameter of one of the mills differed from the average diameter given the tolerance, the mill would be rejected and replaced by another which would, in turn, be adjusted and measured by the machine.

Once the series of mills is adjusted and measured, the machine is ready to adjust a subsequent series.

If the type of cone and therefore the conicity is modified, it suffices to adapt a new receiving cone corresponding to the cone of the conical mandrel.

The series of assemblies thus adjusted is then adapted to be mounted in the broaches of the numerical-control machine tool.

We claim:

1. Machine for automatically adjusting and measuring the length of extension of a tool 2 mounted in a conical mandrel 3 capable of cooperating with a receiving cone 7 of said machine, said conical mandrel 3 being provided with an opening axial tap 5 adapted to receive said tool 2, and comprising a means 9 for tightening said tool 2, as well as a means 17 for adjusting said tool 2 housed in said axial tap 5, said tool 2 coming into contact with said adjustment means 17, said machine comprising a frame 25 and two carriages 26 and 27 movably mounted on said frame 25, and capable of moving respectively parallel and transversely to the axis of said tool 2, characterized in that the first of said carriages 26 comprises said receiving cone 7 receiving said conical mandrel 3 provided with said tool 2, a first control means 31, 32 acting on said tightening means 9, and a second control means 35, 39 acting on said adjustment means 17, in that the second of said carriages 27 comprises a means 48 for detecting and measuring said tool 2 making it possible, when said tool 2 comes into contact with said detection and measuring means 48, to measure the length of extension of said tool 2 with respect to said mandrel 3, means 48 for detecting and measuring said tool 2 being disposed on said second carriage 27, being constituted of a measuring sensor 48 against which the front face 22 of said tool 2 is capable of being applied a retractable sensor cover 49 being mounted on said measuring sensor 48, the placing of said tool 2 in contact against said detection and measuring means 48 being effected by said adjustment means 17, and in that said machine comprises a programmer 57 in which are programmed the operations of adjustment and measurement carried out in accordance with an automatic cycle established previously, a control keyboard 55 for the introduction of specific data in said programmer 57, and a display means 60 receiving a signal 63 from said detection and measuring means 48, corresponding to a magnitude representative of the length of extension of said tool 2, and indicating said extension length.

2. Machine according to claim 1 wherein said two carriages 26 and 27 movably mounted on said frame 25 move at right angles with respect to each other.

3. Machine according to claim 1 wherein said two carriages 26 and 27 movably mounted on said frame 25 move at right angles with respect to each other.

4. Machine according to claim 1 wherein said first control means 31, 32, which is capable of acting on said tightening means 9, is constructed by a motor 31 cooperating by means of said gear means 32 with a corresponding toothed profile 33 arranged on said tightening means 9.

5. Machine according to claim 1 wherein said second control machine 35, 39 capable of acting on said adjustment means 17 housed in said conical mandrel 3 is constituted by a rod 35 of which one end 36 cooperates with said adjustment means 17 and of which the other end 38 is connected to a motor 39 disposed on said carriage 26.

6. Machine according to claim 1, wherein there is provided in said first carriage 26 a traction means 42, 44 intended to grip said conical mandrel 3 in order to maintain it pressed against said receiving cone 7 of said first carriage 26.

7. Machine according to claim 6 wherein said traction means 42, 44 is constituted by a hollow tie-rod 42 adapted to be fixed in the end 43 of said conical mandrel 3 via a motor 44 disposed on said carriage 26 and controlling the movement of said tie-rod 42, said tie-rod 42 enveloping said rod 35.

8. Machine according to claim 1 wherein a computer 65 connected to said display means 60 makes it possible to effect, on the one hand, the average of said lengths of extension of a series of adjusted and measured tools 2, and, on the other hand, the average of the measured diameters of said series of tools 2.

9. Machine according to claim 1 wherein said second carriage 27 further comprises a measuring means 51 making it possible to effect measurement of the diameter of said tool 2.

10. Machine according to claim 9 wherein said means 51 for measuring the diameter of said tool 2 is constituted by an optical sensor 51 disposed on said second carriage 27, the output signal of said sensor 51 corresponding to a magnitude representative of the diameter of said tool 2 being addressed to said display means 60.

11. Machine according to claim 10 wherein a computer 65 connected to said display means 60 makes it possible to effect, on the one hand, the average of said lengths of extension of a series of adjusted and measured tools 2, and, on the other hand, the average of the measured diameters of said series of tools 2.

12. Machine according to claim 10 wherein said specific data introduced via said keyboard 55 in said programmer 57, concern the number of said tools 2 of a series, the type of said cone 7 used, the length of extension said tools 2 in their respective said conical mandrel 3 and the diameter of said tool 2.

13. Machine according to claim 2 wherein said first control means 31, 32, which is capable of acting on said tightening means 9, is constituted by a motor 31 cooperating by means of said gear means 32 with a corresponding toothed profile 33 arranged on said tightening means 9.

14. Machine according to claim 13 wherein said second control means 35, 39 capable of acting on said adjustment means 17 housed in said conical mandrel 3 is constituted by a rod 35 of which one end 36 cooperates with said adjustment means 17 and of which the other end 38 is connected to a motor 39 disposed on said carriage 26.

15. Machine according to claim 14 wherein there is provided in said first carriage 26 a traction means 42, 44 intended to grip said conical mandrel 3 in order to maintain it pressed against said receiving cone 7 of said first carriage 26.

16. Machine according to claim 15 wherein said traction means 42, 44 is constituted by a hollow tie rod 42 adapted to be fixed in the end 43 of said conical mandrel 3 via a motor 44 disposed on said carriage 26 and controlling the movement of said tie-rod 42, said tie-rod 42 enveloping said rod 35.

17. Machine according to claim 1 wherein said specific data introduced via said keyboard 55 in said programmer 57, concern the number of said tools 2 of a series, the type of said cone 7 used, the length of extension of said tools 2 in their respective said conical mandrel 3 and the diameter of said tool 2.

* * * * *